(12) United States Patent
Saad

(10) Patent No.: US 11,616,731 B1
(45) Date of Patent: Mar. 28, 2023

(54) DETERMINING A TIME-TO-LIVE BUDGET FOR NETWORK TRAFFIC

(71) Applicant: Amazon Technologies, Inc., Seattle, WA (US)

(72) Inventor: Sameh George Alphonse Saad, Dublin (IE)

(73) Assignee: Amazon Technologies, Inc., Seattle, WA (US)

( * ) Notice: Subject to any disclaimer, the term of this patent is extended or adjusted under 35 U.S.C. 154(b) by 132 days.

(21) Appl. No.: 17/039,166

(22) Filed: Sep. 30, 2020

(51) Int. Cl.
*H04L 47/28* (2022.01)
*H04L 43/04* (2022.01)
*H04L 45/12* (2022.01)
*H04L 43/0852* (2022.01)
*H04L 47/17* (2022.01)
*H04L 45/00* (2022.01)

(52) U.S. Cl.
CPC ............ *H04L 47/286* (2013.01); *H04L 43/04* (2013.01); *H04L 43/0858* (2013.01); *H04L 45/123* (2013.01); *H04L 45/20* (2013.01); *H04L 47/17* (2013.01)

(58) Field of Classification Search
CPC ....... H04L 47/286; H04L 47/17; H04L 43/04; H04L 43/0858; H04L 45/123; H04L 45/20
See application file for complete search history.

(56) References Cited

U.S. PATENT DOCUMENTS

| 8,160,055 | B1* | 4/2012 | Nadeau | H04L 43/10 370/231 |
|---|---|---|---|---|
| 10,334,322 | B1* | 6/2019 | Seddon | H04L 47/34 |
| 2007/0002740 | A1* | 1/2007 | Evans | H04L 47/2441 370/230.1 |
| 2007/0025241 | A1* | 2/2007 | Nadeau | H04L 45/04 370/241 |
| 2007/0250604 | A1* | 10/2007 | Wu | H04L 12/00 709/214 |
| 2008/0195719 | A1* | 8/2008 | Wu | H04L 67/10 709/213 |
| 2010/0165861 | A1* | 7/2010 | Rrdland | H04W 36/30 370/252 |
| 2010/0268825 | A1* | 10/2010 | Jeong | H04W 52/0216 709/226 |
| 2014/0380459 | A1* | 12/2014 | Lee | H04L 63/1441 726/13 |

(Continued)

*Primary Examiner* — Redentor Pasia
(74) *Attorney, Agent, or Firm* — Klarquist Sparkman, LLP

(57) ABSTRACT

A Time-To-Live budget can be determined for network packets and used to understand an impact of network expansion on dropped packets. Additionally, the TTL budget can be used to determine how network expansion impacts services provided in the data center. In one embodiment, agents executing on data center routers are used to transmit packet header data including a TTL budget to a collector server computer. The collector server computer can discern signal (production flows) from noise (traceroutes and probing traffic) to detect packets that are at risk of being dropped or have been dropped due to TTL expiration. Alerts can be generated for packet flows with dangerously low remaining TTL budget or no remaining budget, which are at high risk of expiring due to operational events resulting in traffic temporarily traversing slightly longer paths. A dashboard can be provided with historic TTL budget data and trends.

16 Claims, 9 Drawing Sheets

(56) References Cited

U.S. PATENT DOCUMENTS

2015/0195178 A1* 7/2015 Bhattacharya ........ H04L 45/745
  718/1
2017/0317780 A1* 11/2017 Wood ..................... H04B 10/27
2018/0367444 A1* 12/2018 Lesartre ................. H04L 45/26

* cited by examiner

DETERMINING A TIME-TO-LIVE BUDGET FOR NETWORK TRAFFIC

BACKGROUND

Traffic on the Internet has grown dramatically over the last decade and continues to grow. Routers play a critical role in sustaining that growth. Data to be passed by routers is generally divided into a series of packets that can be transmitted between devices. Packets include control information and payload data. The control information corresponds to information used by a communication network to deliver the payload data. For example, control information can include source and destination network addresses, error detection codes, packet sequencing identification, and a time-to-live (TTL) parameter. Typically, control information is found in packet headers included within the packet and adjacent to the payload data.

Network routers can be used to forward data packets from a source computing device to a destination computing device in a computer network. In larger networks, a data packet may be routed through multiple routers before reaching its ultimate destination. When one router transmits a data packet to a neighboring router in the network, the transfer can be referred to as a "hop." When a router receives a data packet and identifies a neighboring router to which the data packet should be transmitted, it can be said to have identified a "next hop" for the data packet. At least some routers are configured to determine next hops for data packets using routing tables. A routing table can be used to determine associations between network address prefixes and next hops to which data packets matching the network address prefixes should be routed. Network routing protocols exist that enable routers to build routing tables and converge on a shared network topology. Example routing protocols include the Border Gateway Protocol (BGP), the Open Shortest Path First protocol (OSPF), and the Intermediate System to Intermediate System protocol (IS-IS).

Whatever protocol is used, the TTL parameter ensures the network packet has a limited life span through the network. Each hop decrements the TTL parameter by 1, and a packet is discarded if the packet's TTL reaches a base value, such as 0. In this way, if a network packet is stuck in a loop, it will be discarded. The TTL is also used to prevent malicious packets from traversing a network's routers indefinitely.

DETAILED DESCRIPTION

Network expansion (i.e., adding new hops) can impact a number of packets dropped due to expiration of the TTL parameter. For example, if many packets with a nearly expired TTL are being received in a data center, then expansion of the data center can cause the packets to traverse extra hops, leading to a higher number of dropped packets. By determining a TTL budget remaining for network packets, the impact of network expansion on dropped packets can be examined. Additionally, the TTL budget can be used to determine how network expansion impacts services provided in the data center. Finally, the overall health of the network can be determined through evaluation of the TTL budget.

In one embodiment, agents executing on data center routers are used to transmit packet header data, including a TTL budget, to a collector server computer. The collector server computer can discern signal (production flows) from noise (traceroutes and probing traffic), detecting packets that are at risk of being dropped due to TTL expiration. Alerts can be generated for packet flows with a dangerously low remaining TTL budget, which are at high risk of expiring due to operational events resulting in traffic temporarily traversing slightly longer paths. A dashboard can be provided with historic TTL budget data and trends. This dashboard can be used for forecasting future service impact due to network expansion.

Figure 1:
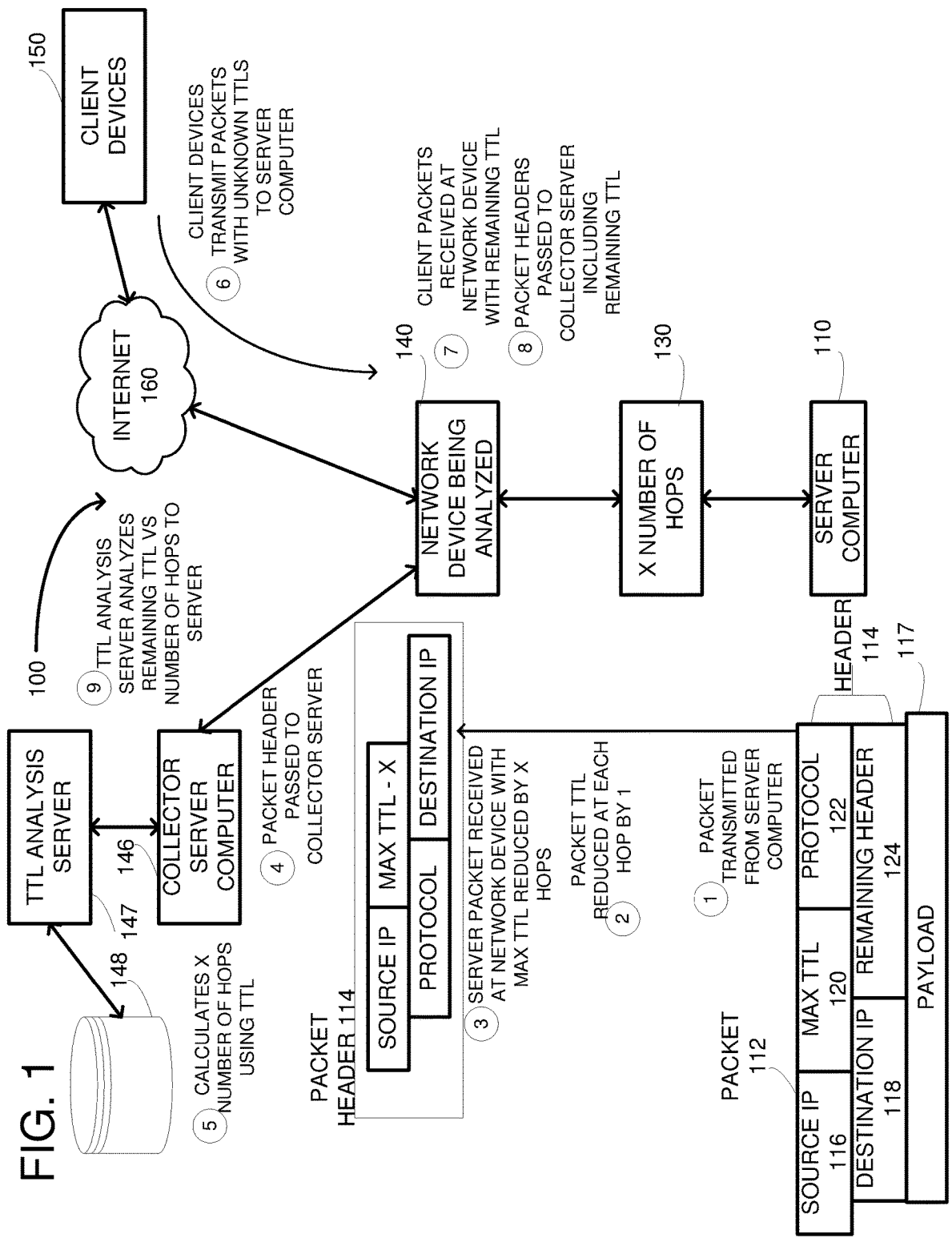
FIG. 1 shows a system diagram for determining a TTL budget for network traffic using a single server computer as an example.

FIG. 1 is a diagram of a system 100 for determining a TTL budget for network traffic having a server computer 110 as a destination address. In FIG. 1, a series of events are shown as numbered 1-9 in order of occurrence. At an event 1, a packet 112 is transmitted from the server computer 110. The packet 112 generally includes a header 114 and a payload 117. The header 114 can include multiple fields, such as a source IP address 116, a destination IP address 118, a TTL field 120, a protocol field 122 and other header fields 124. The TTL field 120 is set by the server computer 110 to a maximum and depends upon the operating system. Typically, the maximum TTL values are 64, 128 or 255. Other values can be used. The protocol field 122 relates to the type of protocol used. At an event 2, the packet 112 is transmitted through multiple hops 130 and at each hop, the TTL field 120 is reduced by 1. The hops 130 can be any network devices, such as switches (multilayer or single-layer), routers, repeaters, and gateways, for example. The hops 130 can also include any device used for forwarding packet data through a network. The hops 130 are generally coupled together by links (not shown) and can be any optical, or electrical cables for interconnecting network devices, such as Ethernet cables, or wireless connections. The number of hops through which the packet 112 traverses is designated as X and can be any integer value. At event 3, the server packet 112 is received at network device 140, which is the network device being analyzed. The network device 140 can be any of the network devices described above and can be the same type of device as the hops 130. As described further below, the network device 140 either randomly or periodically (e.g., fixed time intervals) analyzes packets and transmits select fields from the packet header 114 to a collector server computer 146, as shown at event 4. A TTL analysis server 147 can query the collector server computer 146 for packet header information. At event 5, the TTL analysis server computer 147 calculates the number of hops X using the current TTL. Specifically, the TTL analysis server 147 can make a determination of what is the maximum TTL as set by the server computer. Generally, this determination is accomplished by taking the current TTL received by the network device 140 and rounding up to the next higher number of 64, 128, or 255. The number of hops X is then calculated using a difference between the determined maximum TTL and the current TTL. A database 148 is coupled to the TTL analysis server 147 and can store the hops calculations for various server computers. Thus, in the present case, the source IP address 116 is stored in association with the computed value of X. In analyzing the packet header 114, the TTL analysis server 147 can analyze the protocol field 122, which may or may not be used. When analyzing the protocol field 122, the TTL analysis server 147 can filter out probe packets so that only actual network traffic is used. For example, the TTL analysis server 147 can use a signature of the packet header 114 to determine which packets are probes or test packets and which packets are actual traffic (e.g., client traffic). By performing filtering, the TTL analysis server 147 reduces the number of packets analyzed and removes unwanted noise from the TTL calculation.

Once the number of hops is stored for various server computers, the hops calculations can be used when receiving network packets transmitted by client devices 150. For example, as shown at event 6, the client devices 150 transmit packets with unknown source TTLs via the Internet 160 to the network device 140. Although network packets are shown as traversing the Internet 160, network packets that do not traverse the Internet can also be received by the network device 140 and analyzed. The network device 140 can be in a data center, as described further below, and the data center can include multiple server computers, such as server computer 110. At event 7, the client packets are received with a TTL at the network device 140, which copies the packet headers for transmission to the collector server computer 146, as shown at event 8. At event 9, the TTL analysis server 147 analyzes the header to determine whether the destination address is the server computer 110. For example, a search can be performed on the destination address in the database 148. For packets having a destination address of the server computer 110, the TTL analysis server 147 can determine a difference between the received TTL at event 7 and the previously calculated number of hops X stored in the database 148 (event 5). Analysis can then be done, such as a client distance distribution that maps a percentage of traffic versus a received TTL. Using the distance distribution, a calculation can be made whether new hops can be added to increase the value of X, such as through an expansion of the data center. In one example, if the hop count X is increased, a calculation can be made as to what percentage of traffic will be dropped due to an insufficient TTL. Corrective action can also be taken for TTLs with insufficient remaining budget. One example of a corrective action is increasing the TTL in the packet header or choosing a different routing path that traverses less hops. Other corrective actions can be used.

Figure 2:
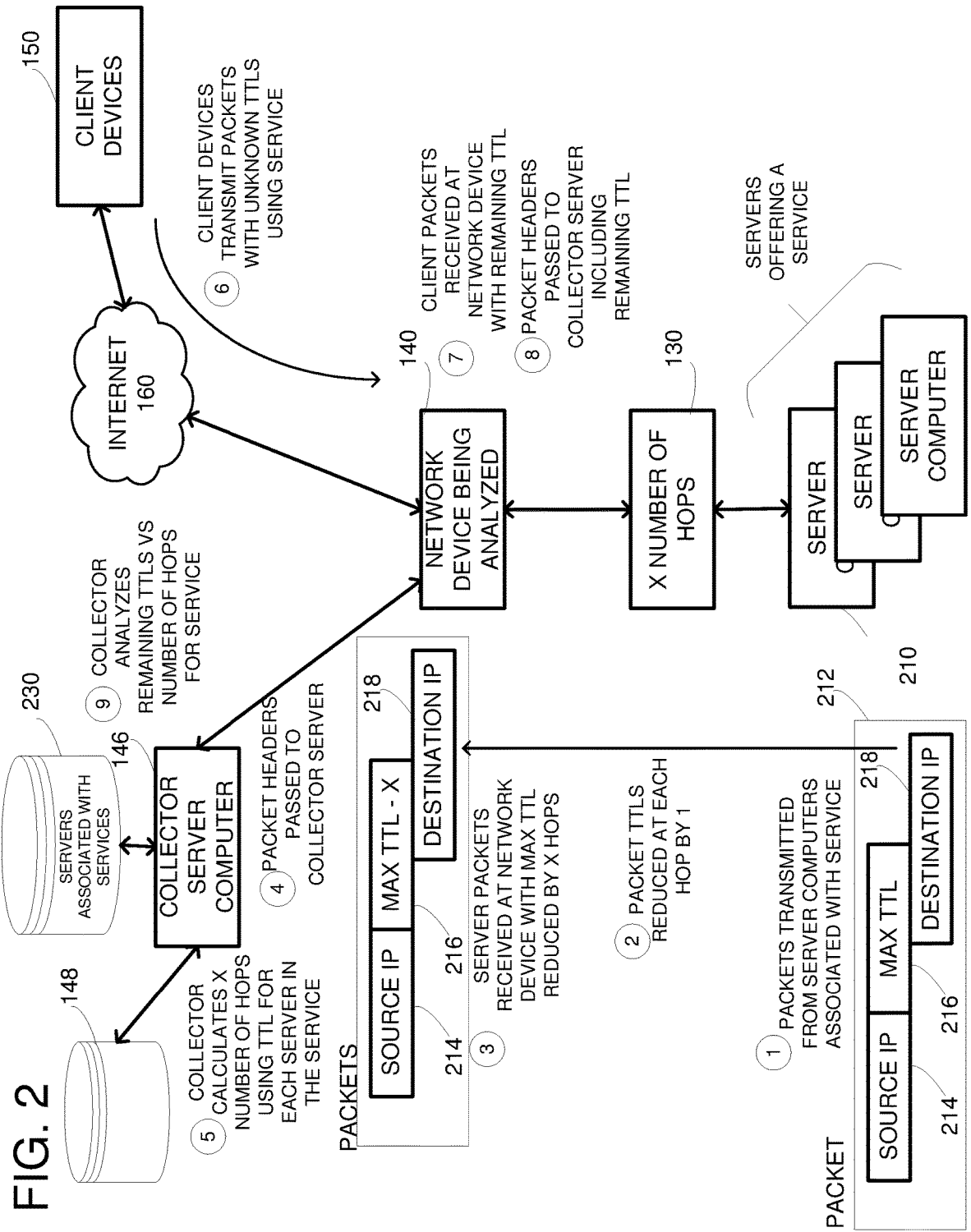
FIG. 2 shows a system diagram for determining a TTL budget for network traffic associated with a group of server computers offering a service.

FIG. 2 is a system diagram indicating how the collector server computer 146 can determine TTL bandwidth for a service offered by a group of server computers 210. At event 1, each of the server computers 210, offering the service, transmit network packets including some of the packet header fields shown at 212. The header 212 can include at least a source IP address 214, a maximum TTL 216 and a destination IP address 218. The source IP address field 214 differs for each server computer 210 that is uniquely associated with an IP address. The maximum TTL field 216 can also differ between server computers. Finally, the destination IP address 218 can differ for each packet transmitted. At event 2, the network packets are transmitted through the hops 130. Each of the server computers in the group 210 can have a different X value as the number of hops through which the network packets traverse can differ before being received by the network device 140. At event 3, the network device 140 being analyzed receives the network packets with the TTL field 216 reduced by the number of hops X from the maximum TTL as set by each of the server computers 210. At event 4, the packet headers are transmitted to the collector server computer 146. At event 5, the collector server computer 146 calculates the number of hops for each server computer in the group 210. In this embodiment, the collector server computer performs the packet header collection and analysis. Alternatively, separate server computers can be used for collection and analysis. The collector server computer 146 can also identify which server computers are associated with a service by querying a database 230 for that information. Data stored in the database 148 can be the number of hops X associated with each server offering the service. In another embodiment, an analysis can be performed based upon a client so as to estimate an amount of packets from a client that will be dropped. At event 6, the client devices 150 transmit packets with unknown TTLs to use the service offered by the server computers 210. The packets from the client devices 150 traverse the Internet 160 and arrive at the network device 140 after an unknown number of hops have been traversed. Once received at the network device 140, as shown at event 7, the packet headers are transmitted to the collector server 146 as shown at event 8. The collector server computer 146 can then analyzes the TTLs versus the number of hops for each server in the group 210. The collector server computer 146 can then analyze how adding additional hops can impact dropped packets for the collective service offered by the group of server computers 210. For example, the estimated dropped packets for adding additional hops can be a single number for the group of server computers 210. In another embodiment, the calculations can be performed in the reverse direction. Specifically, a server can be determined that is a greater number of hops away than the available TTL budget. Thus, the first received packet is from the client and the hop count X to the source IP address database is for the client source IPs and the packets received from the server destined to the client IPs are examined in a similar way as described above to determine whether packets from the server will have sufficient TTL budget. In some environments, packets sent by servers offering a service can traverse a networking device that reset the TTL value (e.g., NAT). In such a case, it can be more efficient to calculate the hop count to the intermediate network device that performed the reset. Additionally, calculations can be performed on a percentage of packets received from the service's servers to calculate X for the entire service, rather than individual servers. A client packet received can be assessed against X generically if its destination is any server within the service.

Figure 3:
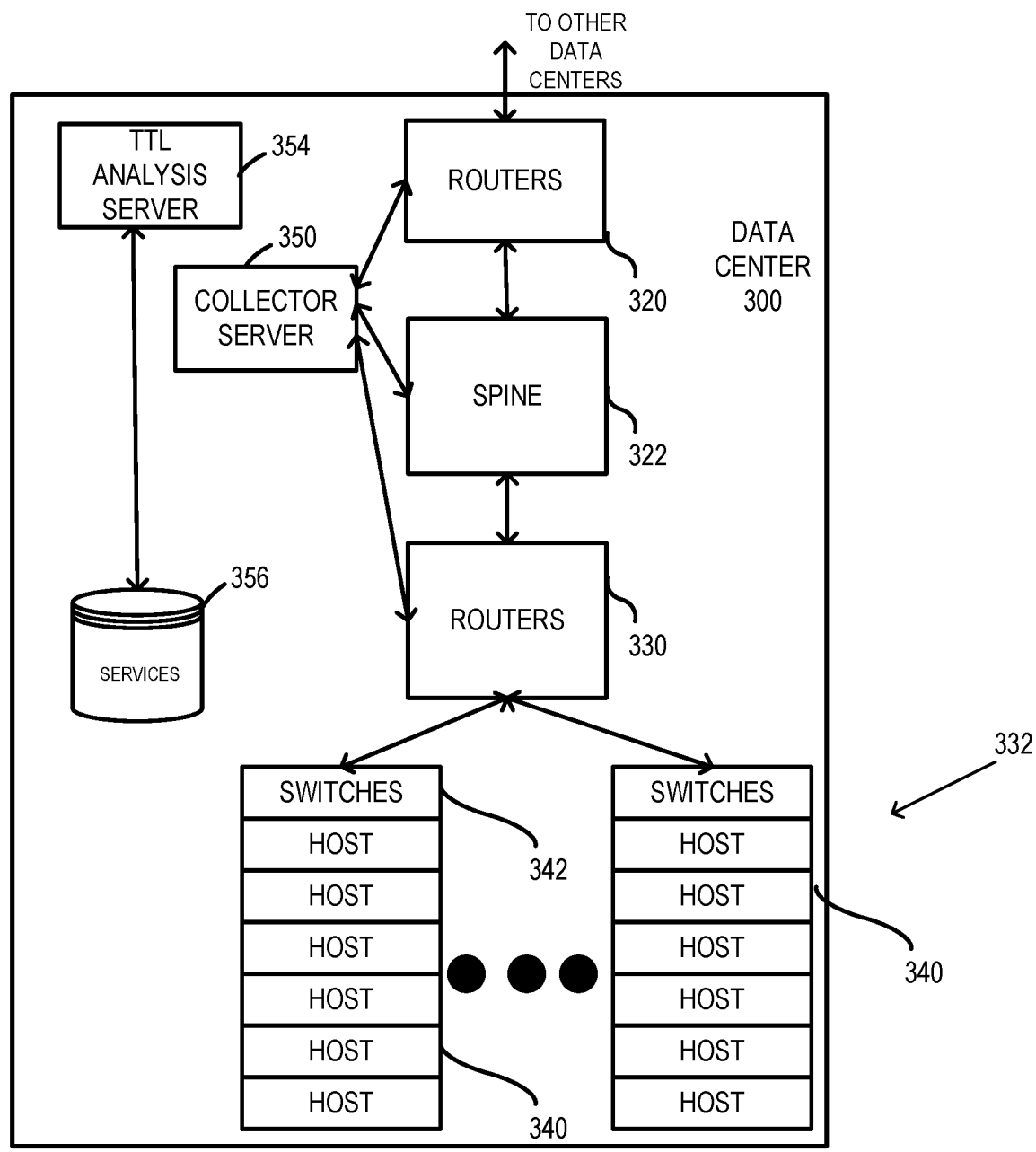
FIG. 3 shows an embodiment wherein the collector server computer is within a data center including multiple levels of routers.

FIG. 3 illustrates an embodiment of a data center 300 in which the local network managers can reside. The data center 300 includes various layers of routers, such as routers 320, 322, and 330. The routers 320 can be a border network, the routers 322 can be a spine network and the routers 330 can include different tiers of routers coupled to server computers, shown generally at 332. The routers 320 receive packets, read address information in a received packet and determine the packet's destination. If the routers 320 decide that a different data center contains a host server computer, then the packet is forwarded to that data center. If the packet is addressed to a host server computer in the data center 300, then it is passed through a layer of spine routers 322, and through any other layers of routers 330 to one or more racks of host server computers 340. Each rack 340 can include a switch 342 coupled to multiple host server computers. The routers can be in a spine-leaf configuration or other network architecture topologies. A collector server computer 350 can be coupled to any of the routers in the data center 300 and receives network packet header data, as described above. A TTL analysis server 354 can receive the header data and perform analysis on the header data to determine the number of hops to the server computers, as described above. A separate database 356 can include services available in the data center 300. For example, the services identified can be an association between offered services and server computers 340 that are used for those services. Different data centers (not shown) can have different collector server computers. The different collector server computers can cooperate together to share data related to services that span more than one data center. The TTL analysis server 354 can perform real-time hop calculations using the techniques described in FIGS. 1 and 2 or can perform off-line analysis using the saved data in database 354.

Figure 4:
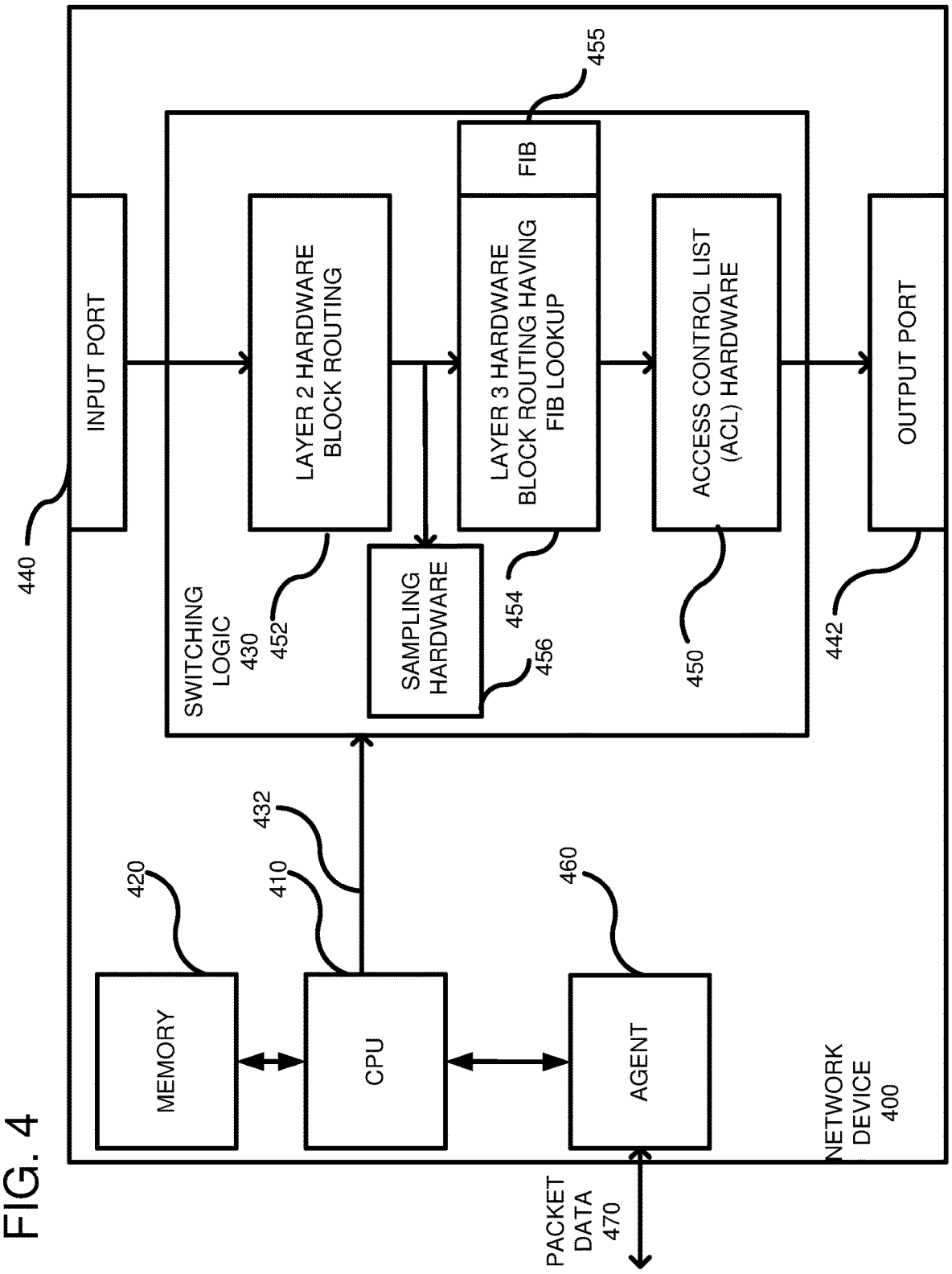
FIG. 4 is an example router that transmits packet headers to the collector server computer.

FIG. 4 shows a detailed example of an embodiment of the network device 400. Network device 400 is a switch that routes packets to a next hop in the network using a destination IP address. The network device 400 is an example of any of the network devices shown in FIGS. 1, 2 and 3. A CPU 410 is coupled to a memory 420 and to switching logic 430 through a bus 432 (PCIe or other protocols and bus types can be used). The switching logic 430 is positioned between an input port 440 and an output port 442, which are typically adapted to receive network cables, such as Ethernet cables. Although only one input port 440 and one output port 442 are shown, typically there are multiple ports (also called interfaces) on a network device. The switching logic 430 can be a single ASIC integrated circuit or divided into multiple integrated circuits. The switching logic 430 can include multiple different hardware logic blocks including a layer 2 hardware block 452, a layer 3 hardware block 454, and an Access Control List (ACL) hardware block 450. The layer 2 hardware block 452 relates to an Ethernet layer and can forward packets based on MAC tables. The layer 2 lookup ensures that an incoming packet's MAC address equals the MAC address of the network device 400. If so, then the packet can proceed onto the layer 3 hardware. If not, then the layer 3 lookup does not occur. The layer 3 hardware block 454 relates to forwarding based on a longest prefix match of an IP address. Layer 3 typically involves a route lookup, decrementing the Time-To-Live (TTL) count, calculating a checksum, and forwarding the frame with the appropriate MAC header to the correct output port. The route lookup of the layer 3 hardware can include searching within a FIB 455, which includes destination addresses (e.g., prefixes) for packets being transmitted through the switching logic and associated ports for forwarding the packets. The network device 400 can run routing protocols, such as an Open Shortest Path First (OSPF) or a Routing Information Protocol (RIP), to communicate with other Layer 3 switches or routers. The routing tables are used to lookup the route for an incoming packet. The ACL block 450 relates to permissions and can include rules whether to drop packets. The different hardware blocks can be coupled in series and additional hardware blocks can be added based on the design. Packets pass from the input port 440 to the output port in accordance with the configuration of the hardware logic blocks 450, 452, 454, which are considered a switching pipeline. The input port 440, output port 442 and switching logic 430 can be considered a data plane or forwarding plane of the network device 400. By contrast, the CPU 410, memory 420, and an agent 460 are considered part of a control plane. Sampling hardware 456 can be provided anywhere in the switching pipeline and periodically or randomly samples packets passing through the network device 400. The sampling hardware 456 is shown in between the layer 2 and layer 3 hardware but can be situated at other locations. As shown, the agent 460 can execute on the CPU 410 and can be used to receive sampled packets from the sampling hardware 456 and transmit packet header data to the collector, such as collector 350 (FIG. 3), as indicated at 470. The agent 460 can either strip the payload and only send the header data or can transmit the full packet to the collector server computer. Although this embodiment shows the sampling hardware 456, the function of the sampling hardware can be performed in software, such as within the agent 460. Additionally, packets sent to the collector can be sampled using export technology (e.g., Netflow) or can be a copy of all packets traversing the network device interfaces using packet mirroring technology.

Figure 5:
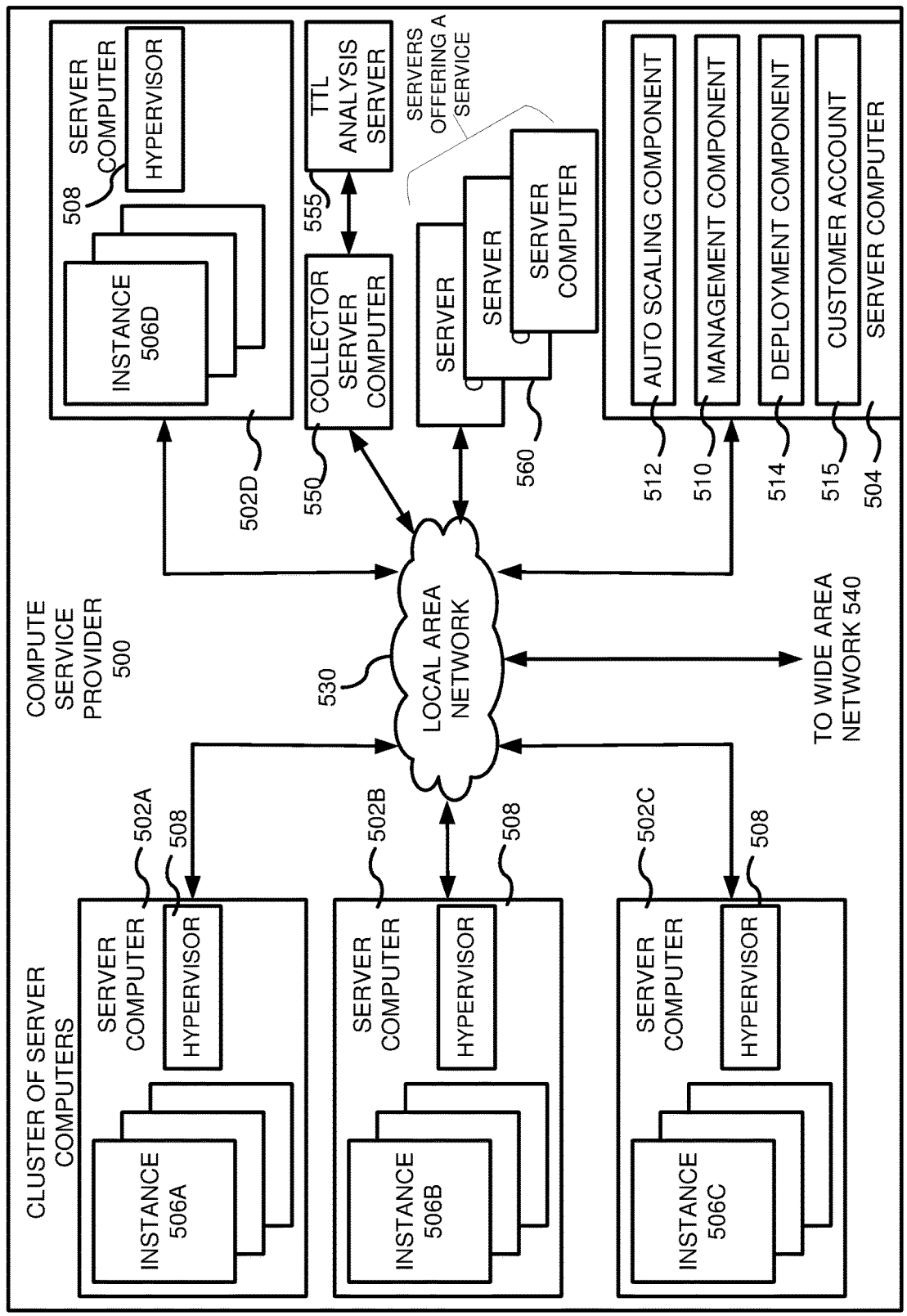
FIG. 5 is an example system diagram showing a plurality of virtual machine instances running in the multi-tenant environment wherein a collector server computer is used for determining the TTL budget.

FIG. 5 is a computing system diagram of a network-based compute service provider 500 that illustrates one environment in which embodiments described herein can be used. By way of background, the compute service provider 500 (i.e., the cloud provider) is capable of delivery of computing and storage capacity as a service to a community of end recipients. In an example embodiment, the compute service provider can be established for an organization by or on behalf of the organization. That is, the compute service provider 500 may offer a "private cloud environment." In another embodiment, the compute service provider 500 supports a multi-tenant environment, wherein a plurality of customers operate independently (i.e., a public cloud environment). Generally speaking, the compute service provider 500 can provide the following models: Infrastructure as a Service ("IaaS"), Platform as a Service ("PaaS"), and/or Software as a Service ("SaaS"). Other models can be provided. For the IaaS model, the compute service provider 500 can offer computers as physical or virtual machines and other resources. The virtual machines can be run as guests by a hypervisor, as described further below. The PaaS model delivers a computing platform that can include an operating system, programming language execution environment, database, and web server. Application developers can develop and run their software solutions on the compute service provider platform without the cost of buying and managing the underlying hardware and software. The SaaS model allows installation and operation of application software in the compute service provider. In some embodiments, end users access the compute service provider 500 using networked client devices, such as desktop computers, laptops, tablets, smartphones, etc. running web browsers or other lightweight client applications. Those skilled in the art will recognize that the compute service provider 500 can be described as a "cloud" environment.

In some implementations of the disclosed technology, the computer service provider 500 can be a cloud provider network. A cloud provider network (sometimes referred to simply as a "cloud") refers to a pool of network-accessible computing resources (such as compute, storage, and networking resources, applications, and services), which may be virtualized or bare-metal. The cloud can provide convenient, on-demand network access to a shared pool of configurable computing resources that can be programmatically provisioned and released in response to customer commands. These resources can be dynamically provisioned and reconfigured to adjust to variable load. Cloud computing can thus be considered as both the applications delivered as services over a publicly accessible network (e.g., the Internet, a cellular communication network) and the hardware and software in cloud provider data centers that provide those services.

With cloud computing, instead of buying, owning, and maintaining their own data centers and servers, organizations can acquire technology such as compute power, storage, databases, and other services on an as-needed basis. The cloud provider network can provide on-demand, scalable computing platforms to users through a network, for example allowing users to have at their disposal scalable "virtual computing devices" via their use of the compute servers and block store servers. These virtual computing devices have attributes of a personal computing device including hardware (various types of processors, local memory, random access memory ("RAM"), hard-disk and/or solid state drive ("SSD") storage), a choice of operating systems, networking capabilities, and pre-loaded application software. Each virtual computing device may also virtualize its console input and output ("I/O") (e.g., keyboard, display, and mouse). This virtualization allows users to connect to their virtual computing device using a computer application such as a browser, application programming interface, software development kit, or the like, in order to configure and use their virtual computing device just as they would a personal computing device. Unlike personal computing devices, which possess a fixed quantity of hardware resources available to the user, the hardware associated with the virtual computing devices can be scaled up or down depending upon the resources the user requires. Users can choose to deploy their virtual computing systems to provide network-based services for their own use and/or for use by their customers or clients.

A cloud provider network can be formed as a number of regions, where a region is a separate geographical area in which the cloud provider clusters data centers. Each region can include two or more availability zones connected to one another via a private high speed network, for example a fiber communication connection. An availability zone (also known as an availability domain, or simply a "zone") refers to an isolated failure domain including one or more data center facilities with separate power, separate networking, and separate cooling from those in another availability zone. A data center refers to a physical building or enclosure that houses and provides power and cooling to servers of the cloud provider network. Preferably, availability zones within a region are positioned far enough away from one other that the same natural disaster should not take more than one availability zone offline at the same time. Customers can connect to availability zones of the cloud provider network via a publicly accessible network (e.g., the Internet, a cellular communication network) by way of a transit center (TC). TCs are the primary backbone locations linking customers to the cloud provider network, and may be collocated at other network provider facilities (e.g., Internet service providers, telecommunications providers) and securely connected (e.g. via a VPN or direct connection) to the availability zones. Each region can operate two or more TCs for redundancy. Regions are connected to a global network which includes private networking infrastructure (e.g., fiber connections controlled by the cloud provider) connecting each region to at least one other region. The cloud provider network may deliver content from points of presence outside of, but networked with, these regions by way of edge locations and regional edge cache servers. This compartmentalization and geographic distribution of computing hardware enables the cloud provider network to provide low-latency resource access to customers on a global scale with a high degree of fault tolerance and stability.

The cloud provider network may implement various computing resources or services that implement the disclosed techniques for TLS session management, which may include an elastic compute cloud service (referred to in various implementations as an elastic compute service, a virtual machines service, a computing cloud service, a compute engine, or a cloud compute service), data processing service (s) (e.g., map reduce, data flow, and/or other large scale data processing techniques), data storage services (e.g., object storage services, block-based storage services, or data warehouse storage services) and/or any other type of network based services (which may include various other types of storage, processing, analysis, communication, event handling, visualization, and security services not illustrated). The resources required to support the operations of such services (e.g., compute and storage resources) may be provisioned in an account associated with the cloud provider, in contrast to resources requested by users of the cloud provider network, which may be provisioned in user accounts.

The particular illustrated compute service provider 500 includes a plurality of server computers 502A-502D. While only four server computers are shown, any number can be used, and large centers can include thousands of server computers. The server computers 502A-502D can provide computing resources for executing software instances 506A-506D. In one embodiment, the instances 506A-506D are virtual machines. As known in the art, a virtual machine is an instance of a software implementation of a machine (i.e. a computer) that executes applications like a physical machine. In the example of virtual machine, each of the servers 502A-502D can be configured to execute a hypervisor 508 or another type of program configured to enable the execution of multiple instances 506 on a single server. Additionally, each of the instances 506 can be configured to execute one or more applications.

It should be appreciated that although the embodiments disclosed herein are described primarily in the context of virtual machines, other types of instances can be utilized with the concepts and technologies disclosed herein. For instance, the technologies disclosed herein can be utilized with storage resources, data communications resources, and with other types of computing resources. The embodiments disclosed herein might also execute all or a portion of an application directly on a computer system without utilizing virtual machine instances.

One or more server computers 504 can be reserved for executing software components for managing the operation of the server computers 502 and the instances 506. For example, the server computer 504 can execute a management component 510. A customer can access the management component 510 to configure various aspects of the operation of the instances 506 purchased by the customer. For example, the customer can purchase, rent or lease instances and make changes to the configuration of the instances. The customer can also specify settings regarding how the purchased instances are to be scaled in response to demand. The management component can further include a policy document to implement customer policies. An auto scaling component 512 can scale the instances 506 based upon rules defined by the customer. In one embodiment, the auto scaling component 512 allows a customer to specify scale-up rules for use in determining when new instances should be instantiated and scale-down rules for use in determining when existing instances should be terminated. The auto scaling component 512 can consist of a number of subcomponents executing on different server computers 502 or other computing devices. The auto scaling component 512 can monitor available computing resources over an internal management network and modify resources available based on need.

A deployment component 514 can be used to assist customers in the deployment of new instances 506 of computing resources. The deployment component can have access to account information associated with the instances, such as who is the owner of the account, credit card information, country of the owner, etc. The deployment component 514 can receive a configuration from a customer that includes data describing how new instances 506 should be configured. For example, the configuration can specify one or more applications to be installed in new instances 506, provide scripts and/or other types of code to be executed for configuring new instances 506, provide cache logic specifying how an application cache should be prepared, and other types of information. The deployment component 514 can utilize the customer-provided configuration and cache logic to configure, prime, and launch new instances 506. The configuration, cache logic, and other information may be specified by a customer using the management component 510 or by providing this information directly to the deployment component 514. The instance manager can be considered part of the deployment component.

Customer account information 515 can include any desired information associated with a customer of the multi-tenant environment. For example, the customer account information can include a unique identifier for a customer, a customer address, billing information, licensing information, customization parameters for launching instances, scheduling information, auto-scaling parameters, previous IP addresses used to access the account, etc.

A network 530 can be utilized to interconnect the server computers 502A-502D and the server computer 504. The network 530 can be a local area network (LAN) and can be connected to a Wide Area Network (WAN) 540 so that end users can access the compute service provider 500. It should be appreciated that the network topology illustrated in FIG. 5 has been simplified and that many more networks and networking devices can be utilized to interconnect the various computing systems disclosed herein.

A collector server computer 550 can operate in the compute service provider 500. In some embodiments, functionality of the collector server computer can be implemented on one or more instances 506A. The collector server computer 550 can be the collector 146 from FIGS. 1 and 2 or the collector 350 from FIG. 3. The collector server computer 550 can be coupled to a TTL analysis server 555 that performs the hop calculations described herein. Network packets can be received via the Internet, or from applications running on the instances 506. Server computers 560 can, in combination, offer a single service of the compute service provider. The services can be any desired cloud-based service, such as services relating to compute, storage, databases, analytics, mobile, management tools, security and enterprise applications. As described in relation to the group of servers 210 of FIG. 2, the servers 560 can be tracked in terms of a number of hops from given routers in a data center, such as a number of hops from the routers 320, 322, or 330 in FIG. 3. In this way, analytics can be used to determine current problems with TTL expiration or problems with TTL expiration that can arise if additional hops are added to the network.

Figure 6:
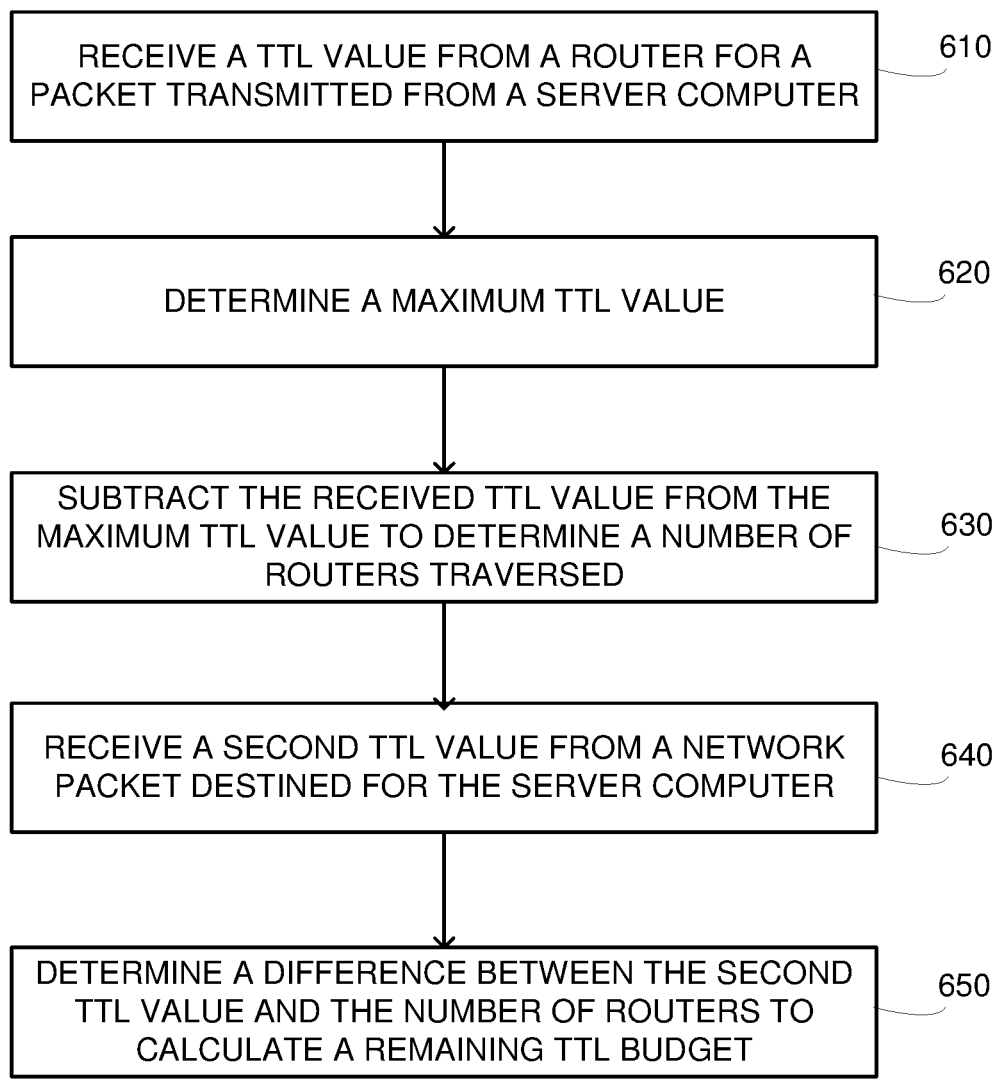
FIG. 6 is a flowchart according to one embodiment for calculating a remaining TTL budget for a network packet.

FIG. 6 is a flowchart of a method according to one embodiment for calculating a TTL budget. In process block 610, a TTL value is received from a router for a packet transmitted from a server computer. For example, in FIG. 1, the network device 140 receives a packet 112 from a server computer 110. In process block 620, a maximum TTL value is determined. Such a determination can be accomplished by assuming that the maximum TTL is either 64, 128 or 255 and rounding the current TTL up to the next possible maximum. Thus, a received TTL of 85 can be rounded up to 128, whereas a received TTL value of 150 can be rounded up to 255. The assumption is that there are not sufficient hops in a data center (generally about 20) to reach a different threshold of the maximum values. At process block 630, the received TTL is subtracted from the maximum TTL to determine a number of hops traversed. For example, a received TTL of 125 results (in process block 620) in a maximum TTL calculation of 128, which is the current TTL rounded up to the next higher of 64, 128 or 255. Then in process block 630, the number of hops is determined to be 3 between the source server computer and the network device being analyzed through the difference calculation of 128-125. In process block 640, another packet is received, such as from a client device, and the packet includes a TTL value and a destination address. It is determined that the destination address is for the same server computer in process block 610, for which the number of hops were calculated. For example, in FIG. 1, packets can be transmitted from one of the client devices 150 and received by network device 140. In process block 650, a difference is determined between the second TTL value received and the number of routers to calculate the remaining TTL budget. Continuing the example above wherein the number of hops was found to be 3, assume the second TTL value is 10. The difference between the second TTL value of 10 and the number of hops (i.e., 3) is 7. According, the remaining TTL budget is 7 indicating that 6 new hops can be added to the network without dropping this packet (i.e., network devices drop packets with a TTL of 1).

Figure 7:
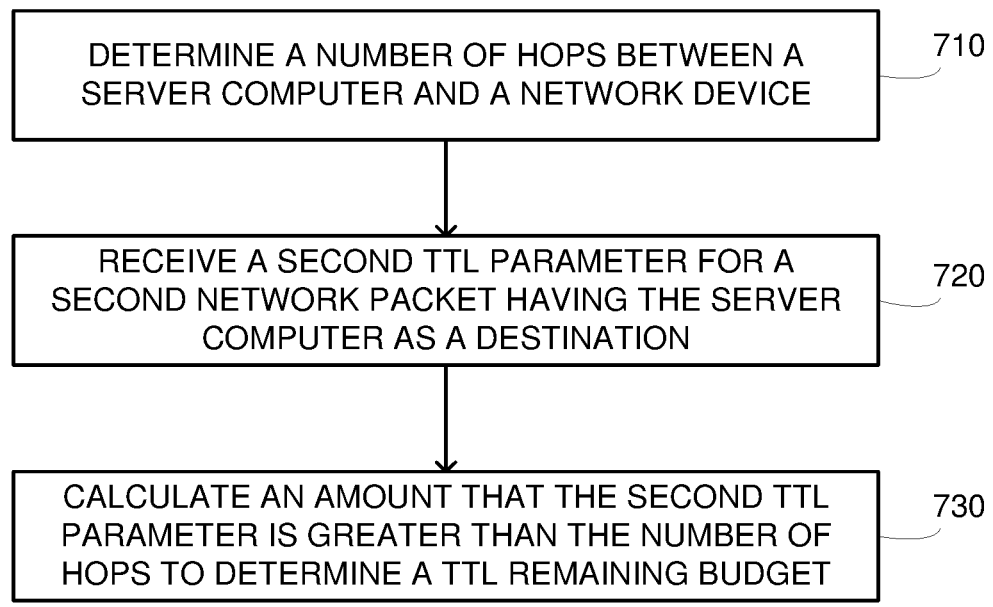
FIG. 7 is a flowchart according to another embodiment for calculating a remaining TTL budget.

FIG. 7 is a flowchart according to another embodiment. In process block 710, a determination of a number of hops between a server computer and a network device is made. For example, such a determination can be made using a TTL parameter in a packet. For example, receipt of a packet from a server computer within a data center can be assumed to have only traversed a small number of hops (e.g., less than 20). In this way, the maximum TTL can be calculated through rounding up to known maximum settings used by server computers within the data center. In one example, topology information is known by a collector server computer, such as is available to the collector server computer 350 from database 356 (FIG. 3). The topology information can include all IP addresses of servers within the data center. In this way, when a source IP address matches the address of a server within the data center, the assumption can be used that the number of hops traversed is less than a difference between the candidate maximum TTL values of 64, 128 and 255. The number of hops is then computed using the selected maximum TTL and the current TTL. The number of calculated hops can then be stored in a database. Other techniques can be used for determining the number of hops. In one example, an Internet Control Message Protocol (ICMP) echo request and reply can be used, such as by sending a request from the router to the server. In process block 720, a second TTL parameter is received for a second network packet having the server computer as a destination. In one example, a packet is received from outside the data center towards a destination server computer in the data center. In process block 730, using the previously calculated hops from a network device to the destination server computer, the remaining TTL budget can be calculated by taking a difference between the TTL and the number of hops. The TTL budget can be used for current alerts or to determine if future upgrades to the data center will be overly detrimental due to the increased number of hops.

Figure 8:
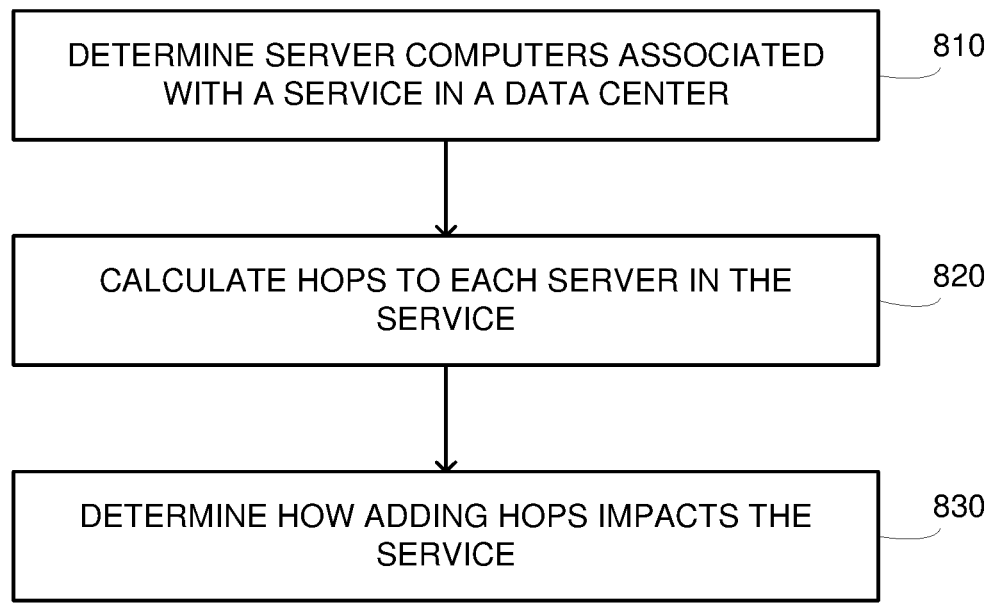
FIG. 8 is a flowchart according to another embodiment for determining how adding additional hops impacts services in a multi-tenant environment.

FIG. 8 is a flowchart according to another embodiment for determining TTL budgets in relation to services. In process block 810, an analysis is performed as to what servers form a service in a data center. In FIG. 3, for example, a database 356 can be used by the collector server 350 to determine what server computers 340 in the data center 300 cooperatively provide a service. In process block 820, a number of hops are calculated for each server in the service using the techniques described above. For example, in FIG. 2, each server 210 in a service can be used as a source and the collector server computer 146 can calculate the hops from the network device 140 to the source server computer. In process block 830, a determination can be made for how adding hops impacts the service. For example, TTL budgets for packets can be analyzed by calculating a difference between the TTLs and the hops, and the TTL budgets can be used to estimate how many hops can be added before a threshold number of packets are dropped.

Figure 9:
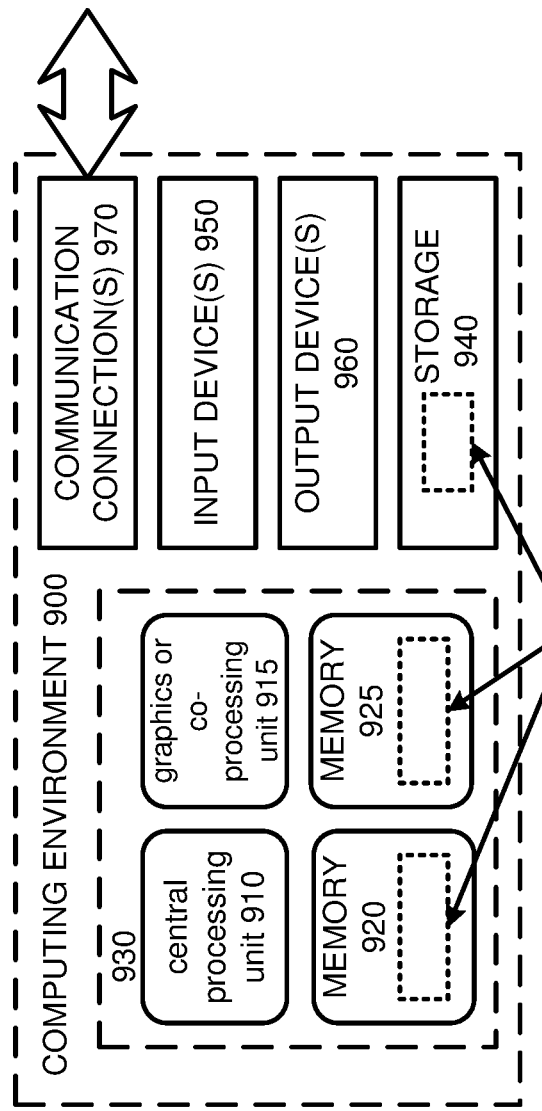
FIG. 9 depicts a generalized example of a suitable computing environment in which the described innovations may be implemented.

FIG. 9 depicts a generalized example of a suitable computing environment 900 in which the described innovations may be implemented. The computing environment 900 is not intended to suggest any limitation as to scope of use or functionality, as the innovations may be implemented in diverse general-purpose or special-purpose computing systems. For example, the computing environment 900 can be any of a variety of computing devices (e.g., desktop computer, laptop computer, server computer, tablet computer, etc.).

With reference to FIG. 9, the computing environment 900 includes one or more processing units 910, 915 and memory 920, 925. In FIG. 9, this basic configuration 930 is included within a dashed line. The processing units 910, 915 execute computer-executable instructions. A processing unit can be a general-purpose central processing unit (CPU), processor in an application-specific integrated circuit (ASIC) or any other type of processor. In a multi-processing system, multiple processing units execute computer-executable instructions to increase processing power. For example, FIG. 9 shows a central processing unit 910 as well as a graphics processing unit or co-processing unit 915. The tangible memory 920, 925 may be volatile memory (e.g., registers, cache, RAM), non-volatile memory (e.g., ROM, EEPROM, flash memory, etc.), or some combination of the two, accessible by the processing unit(s). The memory 920, 925 stores software 980 implementing one or more innovations described herein, in the form of computer-executable instructions suitable for execution by the processing unit(s).

A computing system may have additional features. For example, the computing environment 900 includes storage 940, one or more input devices 950, one or more output devices 960, and one or more communication connections 970. An interconnection mechanism (not shown) such as a bus, controller, or network interconnects the components of the computing environment 900. Typically, operating system software (not shown) provides an operating environment for other software executing in the computing environment 900, and coordinates activities of the components of the computing environment 900.

The tangible storage 940 may be removable or non-removable, and includes magnetic disks, magnetic tapes or cassettes, CD-ROMs, DVDs, or any other medium which can be used to store information in a non-transitory way and which can be accessed within the computing environment 900. The storage 940 stores instructions for the software 980 implementing one or more innovations described herein.

The input device(s) 950 may be a touch input device such as a keyboard, mouse, pen, or trackball, a voice input device, a scanning device, or another device that provides input to the computing environment 900. The output device(s) 960 may be a display, printer, speaker, CD-writer, or another device that provides output from the computing environment 900.

The communication connection(s) 970 enable communication over a communication medium to another computing entity. The communication medium conveys information such as computer-executable instructions, audio or video input or output, or other data in a modulated data signal. A modulated data signal is a signal that has one or more of its characteristics set or changed in such a manner as to encode information in the signal. By way of example, and not limitation, communication media can use an electrical, optical, RF, or other carrier.

Although the operations of some of the disclosed methods are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the attached figures may not show the various ways in which the disclosed methods can be used in conjunction with other methods.

Any of the disclosed methods can be implemented as computer-executable instructions stored on one or more computer-readable storage media (e.g., one or more optical media discs, volatile memory components (such as DRAM or SRAM), or non-volatile memory components (such as flash memory or hard drives)) and executed on a computer (e.g., any commercially available computer, including smart phones or other mobile devices that include computing hardware). The term computer-readable storage media does not include communication connections, such as signals and carrier waves. Any of the computer-executable instructions for implementing the disclosed techniques as well as any data created and used during implementation of the disclosed embodiments can be stored on one or more computer-readable storage media. The computer-executable instructions can be part of, for example, a dedicated software application or a software application that is accessed or downloaded via a web browser or other software application (such as a remote computing application). Such software can be executed, for example, on a single local computer (e.g., any suitable commercially available computer) or in a network environment (e.g., via the Internet, a wide-area network, a local-area network, a client-server network (such as a cloud computing network), or other such network) using one or more network computers.

For clarity, only certain selected aspects of the software-based implementations are described. Other details that are well known in the art are omitted. For example, it should be understood that the disclosed technology is not limited to any specific computer language or program. For instance, aspects of the disclosed technology can be implemented by software written in C++, Java, Perl, any other suitable programming language. Likewise, the disclosed technology is not limited to any particular computer or type of hardware. Certain details of suitable computers and hardware are well known and need not be set forth in detail in this disclosure.

It should also be well understood that any functionality described herein can be performed, at least in part, by one or more hardware logic components, instead of software. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

Furthermore, any of the software-based embodiments (comprising, for example, computer-executable instructions for causing a computer to perform any of the disclosed methods) can be uploaded, downloaded, or remotely accessed through a suitable communication means. Such suitable communication means include, for example, the Internet, the World Wide Web, an intranet, software applications, cable (including fiber optic cable), magnetic communications, electromagnetic communications (including RF, microwave, and infrared communications), electronic communications, or other such communication means.

The disclosed methods, apparatus, and systems should not be construed as limiting in any way. Instead, the present disclosure is directed toward all novel and nonobvious features and aspects of the various disclosed embodiments, alone and in various combinations and subcombinations with one another. The disclosed methods, apparatus, and systems are not limited to any specific aspect or feature or combination thereof, nor do the disclosed embodiments require that any one or more specific advantages be present or problems be solved.

In view of the many possible embodiments to which the principles of the disclosed invention may be applied, it should be recognized that the illustrated embodiments are only examples of the invention and should not be taken as limiting the scope of the invention. We therefore claim as our invention all that comes within the scope of these claims.

What is claimed is:

1. A method of determining a Time-To-Live (TTL) budget, the method comprising:
   receiving a first TTL value from a router, wherein the first TTL value was received by the router in a first network packet from a server computer in a data center;
   determining a maximum TTL value for the first network packet as set by the server computer;
   subtracting the first TTL value from the maximum TTL value to determine a number of routers that the first network packet traversed between the server computer and the router;
   receiving a second TTL value from the router for a second network packet that has a destination of the server computer;
   determining a difference between the second TTL value and the number of routers between the server computer and the router to calculate a remaining TTL budget for the second network packet; and
   further including intercepting network packets at fixed time intervals and transmitting TTL values and a destination server computer address to a collector server computer that determines the remaining TTL budget.

2. The method of claim 1, wherein the server computer is a first server computer of a plurality of server computers that cooperatively operate a service in the data center, the method further including determining a number of routers between each of the plurality of server computers and the router.

3. The method of claim 1, further including determining a plurality of remaining TTL budgets for a plurality of network packets.

4. The method of claim 3, further including simulating adding additional routers between the router and the server computer and determining a percentage of the plurality of network packets that do not have a sufficient remaining TTL budget to arrive at the server computer.

5. A method, comprising:
   determining a number of hops between a server computer and a network device, wherein the determining the number of hops comprises using a first Time-To-Live (TTL) parameter received in a first network packet, wherein the first network packet is transmitted by the server computer and received by the network device, and wherein determining the number of hops further comprises determining a maximum TTL transmitted by the server computer and subtracting the first TTL parameter;
   receiving a second TTL parameter for a network packet received by the network device, wherein the network packet has a destination address that is the server computer; and
   calculating a difference between the second TTL parameter and the number of hops, wherein the difference is a TTL remaining budget;
   wherein the network device periodically collects packet information and transmits the packet information to a collector server computer, wherein the packet information includes a source address, a destination address, a protocol and a TTL parameter.

6. The method of claim 5, further including receiving multiple additional network packets in the network device and calculating TTL remaining budgets for the additional network packets.

7. The method of claim 6, further including simulating increasing the number of hops between the server computer and the network device and analyzing how the increasing impacts the TTL remaining budgets for the additional network packets or simulating increasing the number of hops between the network device and a client device that transmitted the network packet and analyzing how the increasing impacts the TTL remaining budgets for the additional network packets.

8. The method of claim 5, further including using the first TTL parameter as a starting value and setting the maximum TTL by rounding up the starting value to one of three candidate maximum values including 64, 128 and 255.

9. The method of claim 5, wherein the collector server computer compares the source address to source addresses within a data center, and the determining number of hops is performed only for server computers within the data center and the calculating the TTL remaining budget is performed only for destination addresses of server computers within the data center.

10. The method of claim 5, further including filtering out packet information that has a protocol associated with a probe packet.

11. A system, comprising:
    a plurality of server computers in a data center;

a plurality of switches in the data center coupling together the plurality of server computers and coupling the plurality of server computers to a network for communication outside of the data center;

a collector server computer coupled to the plurality of switches and configured to receive packet header data for packets transmitted through the plurality of switches, the collector server computer further configured to calculate a number of hops between select server computers of the plurality of server computers and select switches of the plurality of switches using Time-To-Live (TTL) values received from the plurality of switches;

wherein the collector server computer receives network packets intercepted by the plurality of switches periodically, and wherein the network packets include the TTL values and a destination server computer address to allow the collector server computer to compute a remaining TTL budget to arrive at the destination server computer.

12. The system of claim 11, wherein the collector server computer is further configured to identify if the select server computers are a source of the packets and wherein the calculation of the number of hops is only for the select server computers that are a source of the packets.

13. The system of claim 12, wherein the collector server computer is further configured to calculate a TTL budget for the select server computers that are a destination of the packets, wherein the calculating of the TTL budget includes subtracting the number of hops from a current TTL value of a received packet.

14. The system of claim 13, wherein the collector server computer is further configured to determine, using the TTL budget, which of the plurality of server computers offer a same service and to determine whether increasing the number of hops through data center expansion will impact dropped packets associated with the service.

15. The system of claim 11, wherein the collector server computer is further configured to capture dropped packet data for the plurality of switches.

16. The system of claim 13, wherein the collector server computer is configured to filter out probe packets for calculating the TTL budget.

* * * * *